(12) United States Patent
Woitalla et al.

(10) Patent No.: US 8,251,288 B2
(45) Date of Patent: Aug. 28, 2012

(54) NETWORK-CENTRIC TARGETING

(75) Inventors: Michael J. Woitalla, Fort Wayne, IN (US); Sean M. Beary, Fort Wayne, IN (US)

(73) Assignee: Raytheon Company, Waltham, MA (US)

(*) Notice: Subject to any disclaimer, the term of this patent is extended or adjusted under 35 U.S.C. 154(b) by 960 days.

(21) Appl. No.: 12/250,635

(22) Filed: Oct. 14, 2008

(65) Prior Publication Data
US 2010/0044434 A1  Feb. 25, 2010

Related U.S. Application Data

(60) Provisional application No. 60/980,272, filed on Oct. 16, 2007.

(51) Int. Cl.
*G06F 19/00* (2006.01)
*G06G 7/80* (2006.01)
*F41G 7/00* (2006.01)
*H01Q 17/00* (2006.01)

(52) U.S. Cl. ........ 235/411; 235/400; 235/404; 235/412; 235/413; 244/3.1; 342/2

(58) Field of Classification Search .......... 235/400–418; 244/3.1
See application file for complete search history.

(56) References Cited

U.S. PATENT DOCUMENTS

| | | | |
|---|---|---|---|
| 3,974,328 A * | 8/1976 | Thomas et al. | 348/169 |
| 6,765,498 B1 * | 7/2004 | Sabatino | 340/945 |
| 2004/0233097 A1 * | 11/2004 | McKendree et al. | 342/62 |
| 2005/0004759 A1 * | 1/2005 | Siegel | 701/223 |
| 2005/0023409 A1 * | 2/2005 | Shnaps et al. | 244/3.15 |
| 2007/0021879 A1 * | 1/2007 | DelNero et al. | 701/23 |

OTHER PUBLICATIONS

Richard L. Hughey, "Targeting at the Speed of Light", Feb. 23, 2007, Blue Horizons Paper, found at http://www.au.af.mil/au/awc/awcgate/cst/bh_hughey.pdf.*

* cited by examiner

*Primary Examiner* — Michael G Lee
*Assistant Examiner* — Laura Gudorf
(74) *Attorney, Agent, or Firm* — Daley, Crowley, Mofford & Durkee, LLP (57) ABSTRACT

A network-centric targeting system includes a prepare module to plan for targeting engagements and to identify a target; a sense module to locate targets of opportunity and targets generated by the prepare module to form targeting information; a refine module to enhance the targeting information from the sense module; a track module to maintain a location of a target, a state of the target and target activity, the track module being coupled to the refine module; a target module to select effects and to coordinate delivery of selected effects to the target, the target module being coupled to the track module, the refine module and the sense module; a deliver module to deliver effects to the target, the deliver module being coupled to the track module, the refine module, the target module and the sense module; and an assess module to assess effectiveness of the delivered effects on the target.

16 Claims, 4 Drawing Sheets

NETWORK-CENTRIC TARGETING

RELATED APPLICATIONS

This application claims priority to Provisional Application Ser. No. 60/980,272 filed on Oct. 16, 2007 and titled "NETWORK-CENTRIC TARGETING," which is incorporated herein in its entirety.

BACKGROUND

In the battlefield, a field commander locates and targets an enemy and delivers weapons to engage the enemy. There are a number of targeting processes that enable the field commander to engage enemy targets. One process is a find, fix, track, target, engage and assess (F2T2EA) process. The F2T2EA process includes the steps of finding a target, developing a fix on the target, tracking the target, engaging the target and assessing the results of engaging the target. Another process is called a decide, detect, deliver and assess (D3A) process. The D3A process includes the steps of deciding the targets to be attacked, detecting where the targets are located, delivering effects to the targets and assessing the effects of the engagement. The F2T2EA and the D3A processes are characterized as serial processes because the steps in each process are performed one step at a time.

SUMMARY

In one aspect, a network-centric targeting system includes modules. The modules include a prepare module to plan for targeting engagements and to identify a target, a sense module to locate targets of opportunity and targets generated by the prepare module to form targeting information, a refine module to enhance the targeting information from the sense module and a track module to maintain a location of a target, a state of the target and target activity. The track module is coupled to the refine module. The modules also include a target module to select effects and to coordinate delivery of selected effects to the target. The target module is coupled to the track module, the refine module and the sense module. The modules further include a deliver module to deliver effects to the target and is coupled to the track module, the refine module, the target module and the sense module, and an assess module to assess effectiveness of the delivered effects on the target. The assess module is coupled to the track module, the deliver module, the target module, the sense module and the prepare module. One or more of the modules include a processor and a storage medium to store executable instructions performed by the processor. The modules provide a user with a battle-space-wide single application (SA) view of both strategic and tactical targets.

In another aspect, a method includes planning for targeting engagements comprising identifying a target, sensing a target including locating targets of opportunity and targets generated by the planning to form targeting information, enhancing the targeting information, tracking a location of a target, a state of the target and target activity using the enhanced targeting information, targeting the target to select effects and to coordinate delivery of the selected effects to the target, delivering the selected effects to the target and assessing an effectiveness of the delivered effects on the target, the assessing based on the tracking, the delivering, the sensing and the preparing.

In a further aspect, an article includes a machine-readable medium that stores executable instructions to provide a network-centric targeting system. The instructions causing a machine to plan for targeting engagements comprising identifying a target, sense a target including locating targets of opportunity and targets generated by the planning to form targeting information, enhance the targeting information, track a location of a target, a state of the target and target activity using the enhanced targeting information, target the target to select effects and to coordinate delivery of the selected effects to the target, deliver the selected effects to the target and assess an effectiveness of the delivered effects on the target, the assessing based on the tracking, the delivering, the sensing and the preparing.

DETAILED DESCRIPTION

Prior art approaches to targeting are serial and process oriented. For example, in the F2T2EA process, systems executing the targeting step would not be notified until completion of the tracking step. Described herein is an approach to targeting, called network-centric targeting (NCT). Unlike prior art approaches, the NCT is network-centric and also capabilities focused. The NCT supports current methodologies. For example, the systems used in implementing the F2T2EA process or the D3A process, may be incorporated into NCT but with the serial nature removed. In particular, NCT removes the stove-pipe nature of these processes by linking the capabilities. The NCT allows for a constant sharing of information. The NCT is also flexible to support new and emerging processes and systems. NCT also includes intelligence functions in addition to weapon target pairing and effects delivery.

Figure 1:
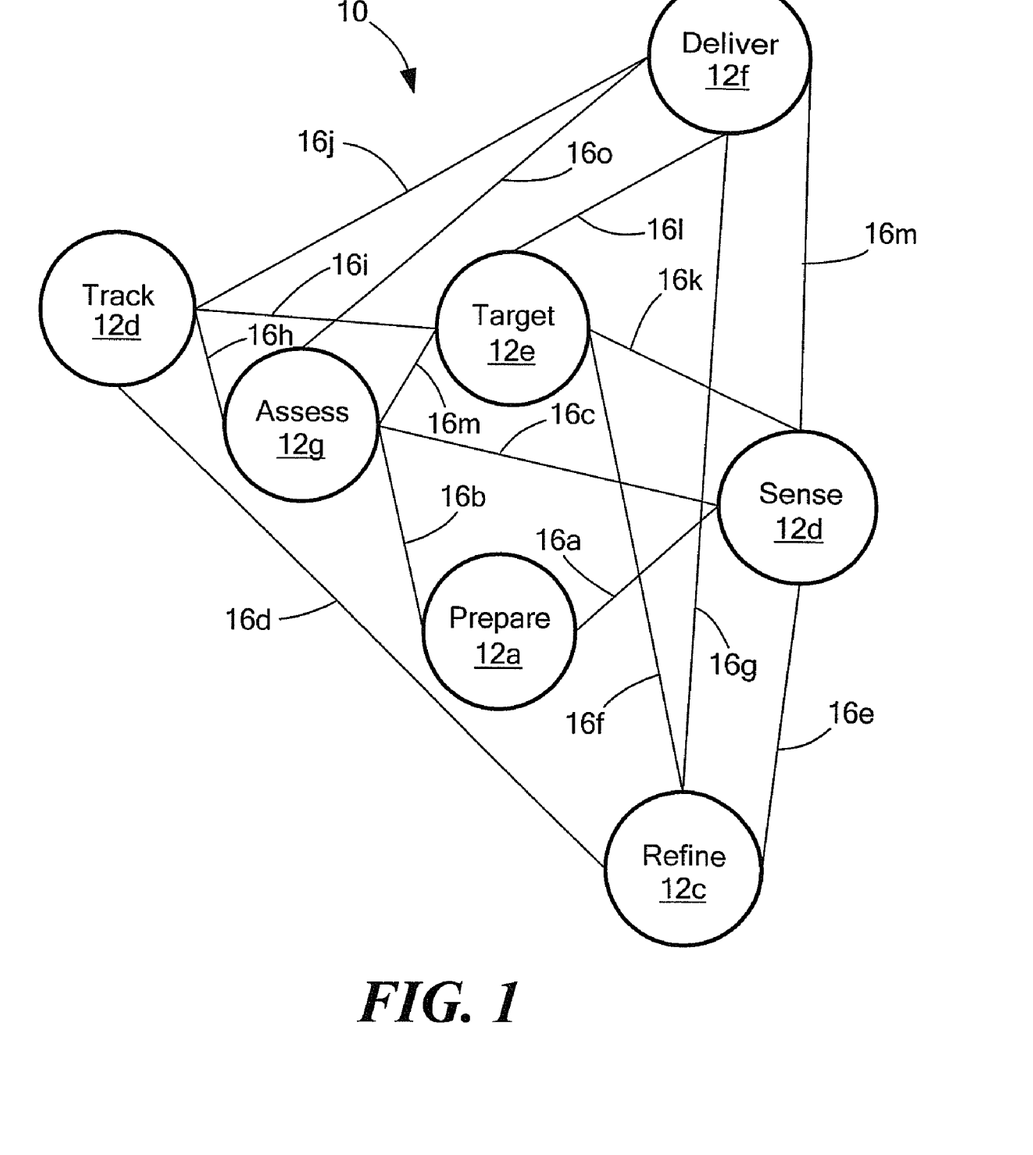
FIG. 1 is a functional block diagram of a network-centric targeting (NCT) system including modules.

Referring to FIG. 1, an NCT system 10 includes a prepare module 12a, a sense module 12b, a refine module 12c, a track module 12d, a target module 12e, a deliver module 12f and an assess module 12g. Each module 12a-12g represents targeting capabilities; thereby each module is equal without hierarchical or procedural dependencies. The modules 12a-12g perform concurrently so that the modules receive critical information earlier in time in order to speed processing than prior art targeting systems. In one example, the modules 12a-12g are in one system located in one geographic location. In other embodiments, one or more of the modules 12a-12g are located across widely dispersed geographic areas from a few miles of separation to thousands of miles of separation. In some example, one or more of the modules 12a-12g may be land-based, sea-based or air-based.

The modules 12a-12g are connected by a number of connections (e.g., connections 16a-16o). The prepare module 12a is connected to the sense module 12b by a connection 16a and to the assess module 12g by a connection 16b. The sense module 12b is connected to the assess module 12g by a connection 16c, to the refine module 12c by a connection 16e, to the target module 12e by a connection 16k and the deliver module 12f by a connection 16n. The refine module 12c is connected to the track module 12d by a connection 16d, to the target module 12a by a connection 16f and to the deliver module 12f by a connection 16g. The track module 12d is connected to the assess module 12g by a connection 16h and to the deliver module 12f by a connection 16j. The assess module 12g is connected to the target module 12e by a connection 16m and to the deliver module by a connection 16o. The target module 12e is connected to the track module 12d by a connection 16i and to the deliver module 12f by a connection 16l. The connections 16a-16o may be uni-direction connections or bi-directional connections. The modules 12a-12g may also be connected by a combination of uni-directional and bi-directional connections. The connections 16a-16o may be wireless or wired connections.

The prepare module 12a executes a prepare process which includes functions and activities associated with planning for targeting engagements. The prepare process includes intelligence preparation of the battlefield, sensor collection planning, effector emplacement, commander's guidance creation, high value target list generation and dissemination and so forth. The prepare process also includes determining long term pre-planned strikes. Information from the prepare module 12a is used directly by the sense module 12b through the connection 16a. The prepare module 12a also uses information that is generated by the assess module 12g through the connection 16b. For example, if the assess module 12g determines a target is not destroyed, the prepare module 12a uses the information to plan on engaging the target again.

The sense module 12b executes a sense process which includes functions and activities associated with finding targets of opportunities and those targets identified by the prepare module 12a through the connection 16a as pre-planned targets. The sense module 12b generates a target report. The target report may include location and target identification to varying degrees of confidence and fidelity. The sense module 12b also uses information generated by the assess module 12g from the connection 16c. For example, if the assess module 12g determines that a target is not destroyed; the sense module 12b continues looking for the target. The outputs generated from the sense module 12b are used by the deliver module 12f, the target module 12e and the refine module 12c.

The refine module 12c executes a refine process which includes functions and activities associated with enhancing collected targeting information to assist in the delivery of effects (e.g., munitions, jamming and so forth) on the target. The refine process also includes but is not limited to data fusion, target mensuration, and target correlation. The refine module 12c uses information generated by the track module 12d from a connection 16d and the sense module 12b from the connection 16e. The outputs generated from the refine module 12c are used by the track module 12d from the connection 16d, the target module 12e from the connection 16f and the delivery module 12f from the connection 16g.

The track module 12d executes a tracking process which includes functions and activities associated with maintaining awareness of a target's location, state and activity. The track module 12d uses information generated by the refine module 12c from the connection 16d, the assess module 12g from a connection 16h and the target module 12e from a connection 16i. The outputs generated from the track module 12d are used by the refine module 12c using the connection 16d, the assess module 12g from the connection 16h, the target module 12e from the connection 16i, and the deliver module 12f from the connection 16j.

The target module 12e executes a target process which includes functions and activities associated with the selection of effects and the coordination of the delivery of the selected effects to the target including coordination with all parties and agencies affected. The target module 12e uses information generated by the sense module 12b from the connection 16k, the refine module 12c from the connection 16f, the track module 12d from the connection 16i, the deliver module 12f from the connection 16l and the assess module 12g from the connection 16m. The outputs generated from the target module 12e are used by the track module 12d, the assess module 12g and the deliver module 12f.

The deliver module 12f executes a deliver process which includes functions and activities associated with the delivery of effects including both lethal and non-lethal effects. Effects may include weapons, electronic counter measures and so forth. The deliver module 12f uses information generated by the sense module 12b from the connection 16n, the refine module 12c from the connection 16g, the track module 12d from the connection 16j, the target module 12e from the connection 16l, and the assess module 12g from the connection 16o. The outputs generated from the deliver module 12f are used by the assess module 12g and the target module 12e.

The assess module 12g executes an assess process which includes functions and activities associated with the assessment of effectiveness of the delivered effects on the target, for example, determining the next actions with respect to the target. The assess module 12g uses information generated by the track module 12d, the target module 12e and the deliver module 12f. The outputs generated from the assess module 12g are used by the prepare module 12a, the sense module 12b, the target module 12e, the track module 12d and the deliver module 12f.

Figure 2:
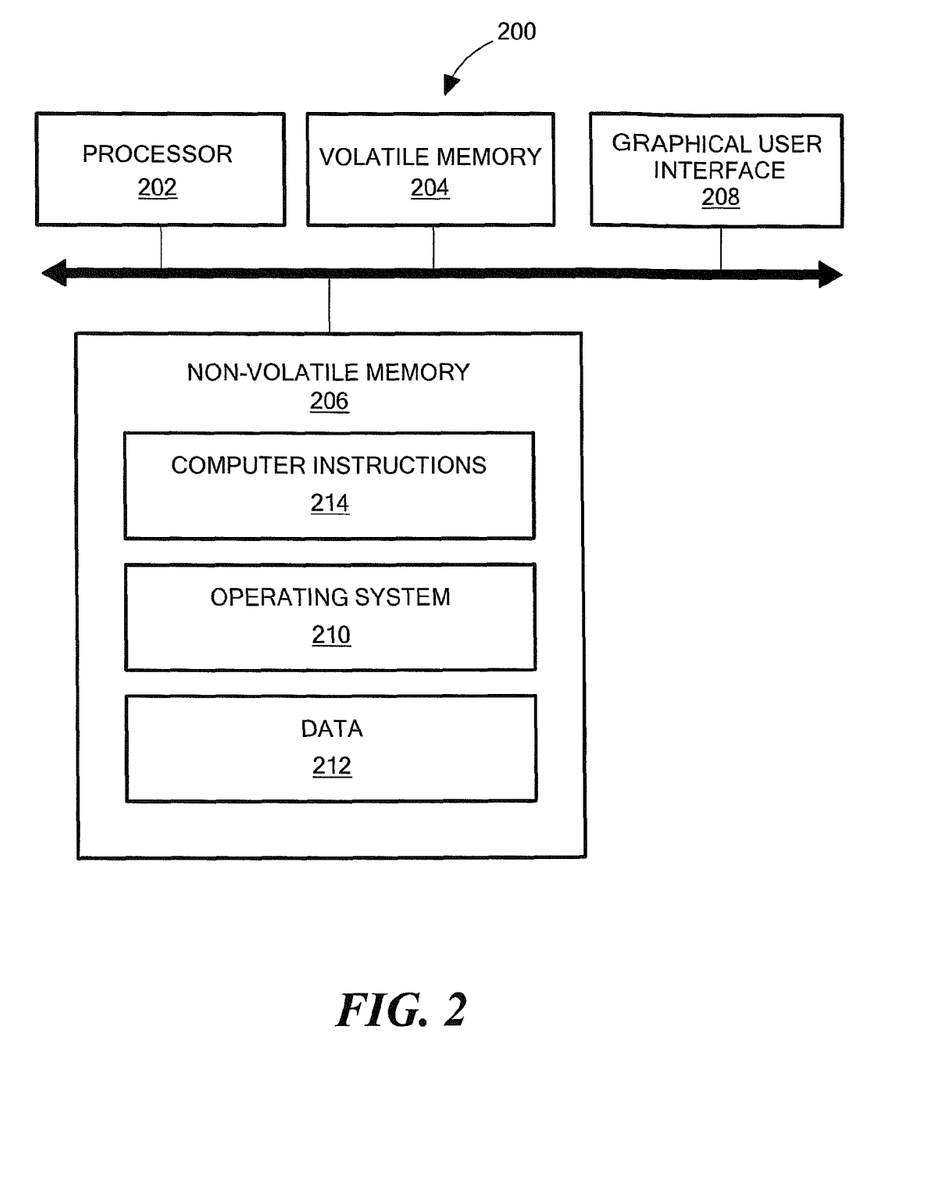
FIG. 2 is a block diagram of a computer used to implement at least one of the modules of FIG. 1.

One or more of the modules 12a-12g may be implemented as a computer, for example, a computer 200 in FIG. 2 to execute a corresponding process (e.g., the prepare module 12a executes the prepare process, the sense module 12b executes the sense process and so forth). The computer 200 includes a processor 202, a volatile memory 204, a non-volatile memory 206 (e.g., hard disk) and a graphical user interface (GUI) 208. Non-volatile memory 206 includes an operating system 210, data 212 and computer instructions 214 which are executed out of volatile memory 204 to perform the respective process (e.g., the prepare process, the sense process and so forth).

The processes performed by 12a-12g are not limited to use with the hardware and software of FIG. 2; rather they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to the perform processes and to generate output information.

Figure 3:
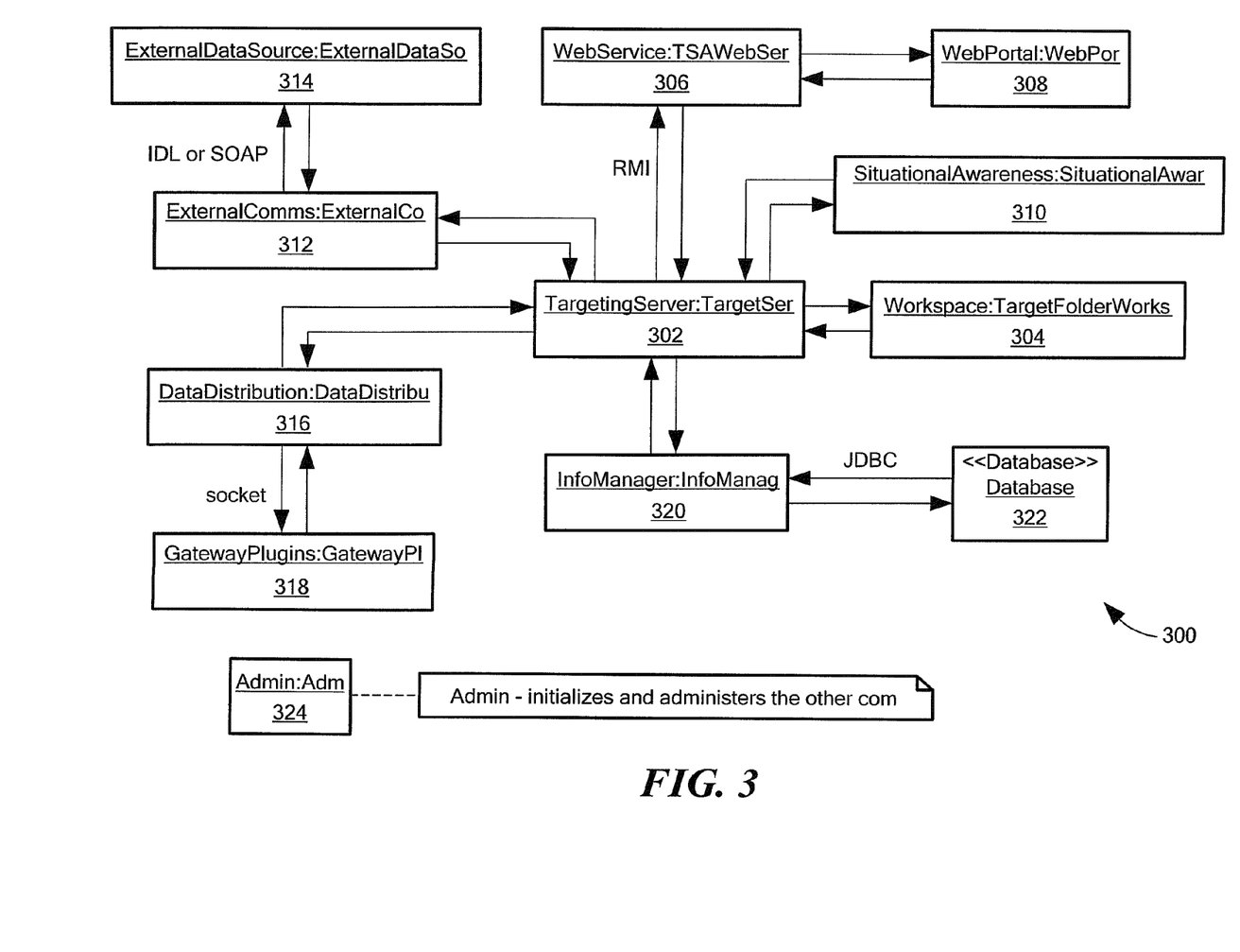
FIG. 3 is an example of a schema for implementing the NCT system of FIG. 1.

Referring to FIG. 3, in order to be net-centric, a system (or system of systems), cannot be merely an implementation of the modules 12a-12g or their functionality where the modules 12a-12g are just connected to each other. For example, one or more of the modules 12a-12g may be legacy systems that define targets differently, use different formatting and so forth than the other modules. Also, the modules 12a-12g may have connections to other systems (not shown) and be modeled after a point-to-point paradigm and thus are not designed to communicate with the other modules. Therefore, there is no additional benefit to the joint targeting process by merely connecting systems that have a point-to-point paradigm because not all of the modules 12a-12g are included. Rather, a system (e.g., the NCT system 10) that implements a net-centric targeting model is one that not only provides the functionality described at each of the modules 12a-12g, but also includes the connectivity shown in FIG. 3, for example.

An NCT schema 300 for implementing the NCT system 10 includes a targeting server component 302 that is connected to a workspace component 304; a web service component 306 connected to the web portal component 308; a situational awareness component 310; external communications component 312 connected to an external data source component 314; data distribution component 316 connected to gateway plug-ins component 318; and an informational manager 320 connected to a database 322. The NCT schema 300 also includes an administration function 324 used to add, modify and delete any of the functionality in the NCT system 300. For example, a number of configuration parameters that dictate the people, the equipment and the locations in the NCT system 10 may be used and configured by a user using the administration function 324.

The targeting server component 302 integrates the functionality of the modules 12a-12g. The targeting server component 302 may receive data from and/or provide data to the external data source component 314 through the external communications component 312 using an interface such as one based on an Interface Definition Language (IDL) or a SOAP protocol, for example. The database 322 stores the target data provided by the target server component 302 through the information manager 320 using Java Database Connectivity (JDBC), for example.

The targeting server component 302 may also be accessed by a user and/or systems using the world-wide web (WWW) through the web server component 306 and/or by the web portal component 308 through the web server component 306 using a Remote Method Invocation (RMI), for example.

The targeting server component 302 may also provide and receive information from the gateway plug-ins component 318 through the data distribution component 316 using a socket, for example. The targeting server component 302 is one of the vital components of the NCT system 300 because it monitors and updates normalized target data. For example, the targeting server component 302 continually looks for linkages between targets by comparing the information stored within each update for overlap or duplication. Further, each update received is processed by the targeting server component 302 where it determines which pieces of targeting data need to be updated and stored as well as what items of information need to be shared and forwarded with other NCT systems (not shown), for example, and other external systems. Beyond target data management, the targeting server component 302 also provides the foundation for the targeting workflow functionality. With the workspace component 304 and a situational awareness component 310 (also known as GUI components), the targeting server component 302 allows the operator to manipulate the information and access workflow tools to properly manage targeting operations.

The data distribution component 316 and the gateway plug-ins component 318 form a gateway (e.g., a gateway 418 (FIG. 4)) used as a transport mechanism to share data amongst other NCT systems (not shown). The data distribution component 316 includes the rule sets for how, why, and who to share information with in order to account for multiple instances of NCT systems running within various enterprises. The gateway plug-ins component 318 abstracts out the actual transport mechanism so that different mechanisms for handling the distribution to other nodes may be replaced.

The situational awareness component 310 and the workspace component 304 are used to visualize the data. For example, the situational awareness component 310 provides map displays to a user. The workspace component 304 collects screens that display all of the target data to the user and includes target folders. The NCT schema 300 provides a set of web services (e.g., the web service component 306) for the creation, modification, deletion and distribution of not only targets but of targeting knowledge, in the form of target folders. The target folders include both structured and unstructured files and data important for both understanding the target and for making a potential target into a target. Additionally, the target folders include other target folders so that the user can organize targets to enhance target management. The NCT schema 300 provides an overall summary list of its targets (e.g., stored in the database 322) and also allows users to initiate prosecution of individual targets or target lists via fires from AFATDS or via air support from TBMCS.

JTM allows users to have a common situational awareness (e.g., using the situational awareness component 310) of the complete list of targets as entered into the NCT schema 300, along with their originating systems, locations, and other summary data and attributes. This common target catalog allowed users to identify who is already responsible for a target, or to identify targets that need special attention, including handoff from one system to another.

Using the NCT schema 300, the NCT system 10 has the communication paths created to execute targeting operations in parallel and to bypass the legacy targeting processes for expediency. Following a service-oriented architecture (SOA) paradigm, this is created by developing a family of services to implement the functionality of each module 12a-12g and by allowing the SOA infrastructure to enable the correct communication paths between these services. In other examples, a single, central application may be implemented that would still have point-to-point connections of legacy systems that provide the required functionality to other systems (not shown) but internally enable the communications paths required by the net-centric targeting model.

In other examples, the NCT system 10 may be implemented using legacy systems. For example, the NCT system 10 is embodied in a Joint Target Manager (JTM) manufactured by Raytheon Company of Waltham, Mass., an assignee of this application. The JTM includes tie points into existing systems to leverage capabilities of fielded, stove-piped systems and bring those capabilities into the NCTS 10. For example, Raytheon's Distributed Common Ground Station (DCGS) Integration Backbone (DIB) is an infrastructure within which to run JTM. Running on top of the DIB, DCGS provides capabilities to perform target mensuration (i.e., the refine module 12c) as well as Battle Damage Assessment (BDA) (i.e., the access module 12g). These capabilities are made available to the operator via JTM. Likewise, JTM has connections to Raytheon's Advanced Field Artillery Tactical Data System (AFATDS), and Lockheed Martin's Theater Battle Management Core Systems (TBMCS) to perform targeting functions. The data gathered by JTM is available in a single workspace that incorporates the entire lifecycle of that target, so that there is always the most current information available to all operators, regardless of their military function.

What the NCT system 10 adds to existing systems which never existed before is the embodiment of all of these capabilities in one single framework. The NCT system 10 not only incorporates the capabilities provided in those other existing systems, but also provides the connectivity so that data can be shared across the modules 12a-12g, in effect embodying the connections 16a-16o as well as the modules. These multiple connections 16a-16o are transparent to an operator, so that the operator does not need to know where or how to get the information required to successfully completing their tasks.

For example, some of the available functionality for the sense module 12b, the deliver module 12f, the assess module 12g and the target module 12e utilize JTM to provide all of the connections 16a-16o between them. Also, the AFTADS may be used to implement, for example, the deliver module 12f and the prepare module 12a to provide weapon-target pairing functionality for indirect ground-to-ground fires. The DCGS provides the sense module 12b, the prepare module 12a, the assess module 12g and the track module 12d to implement, for example, initial target sensor data. The JTM provides the target module 12e, the prepare module 12a and the connections 16a-16o in order to take the data and act as a pass-through to share the information to the other systems. The TBMCS provides the deliver module 12f and the prepare module 12a to provide, for example, weapon-target pairing for air-to-ground assets. JTM and/or other applications (e.g., DIABLO) may also be used to provide the connections 16a-16o between the other legacy systems so that targets may be concurrently prosecuted within a targeting thread. The other applications allow for extraction of target and track related information from external targeting sources.

Figure 4:
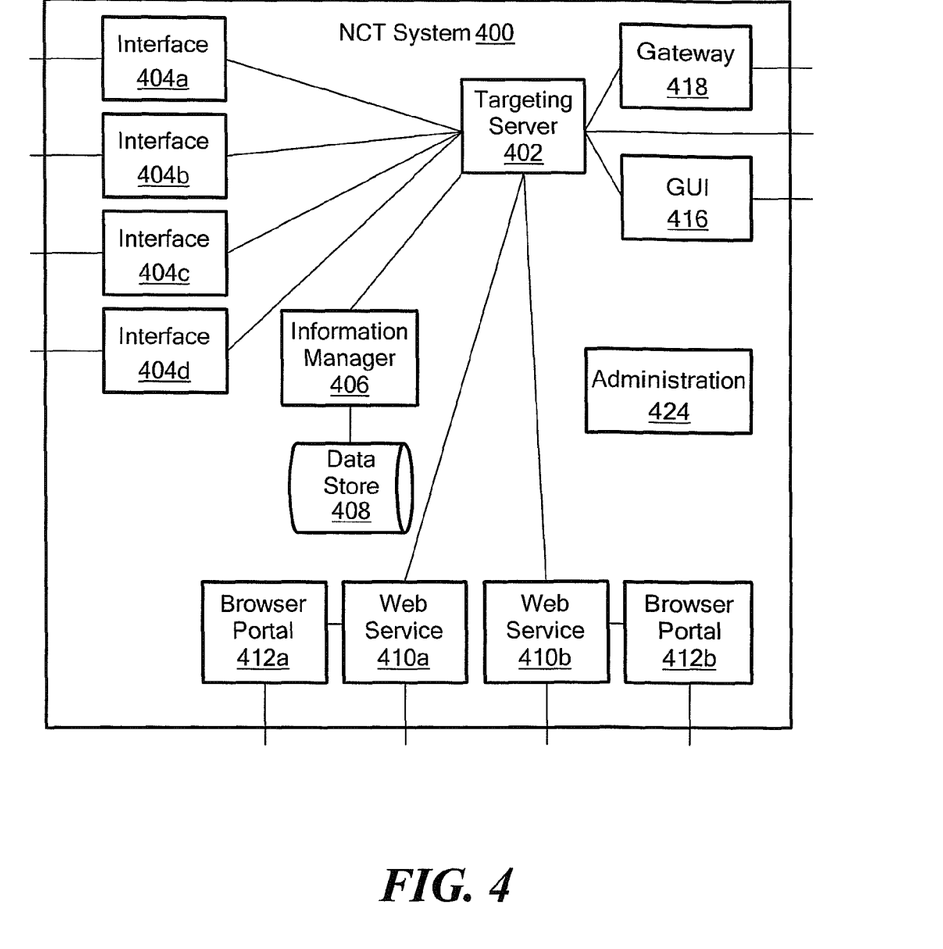
FIG. 4 is an example of implementing the NCT system using the schema of FIG. 3.

Referring to FIG. 4, an NCT system 400 is an example of an implementation of the NCT system 10 using legacy systems. The NCT system 400 includes a targeting server 402 (e.g., corresponding to target server component 302), interfaces 404a-404d, an information manager 406 (e.g., corresponding to information manager 320) connected to a data store 408 (e.g., corresponding to database 322), web service components 410a, 410b (e.g., corresponding to web service component 306) each connected to a respective browser portal 412a, 412b (e.g., corresponding to the web portal 308), a GUI 416, a gateway 418 and an administration function (e.g., corresponding to the administration function 324).

The interfaces 404a-404d represent interfaces to existing legacy systems. In one example, a legacy system is a Cursor on Target (CoT) which is an XML schema used in Air Force systems as a means of exchanging basic target information. Other examples of legacy systems include AFATDS, and TBMCS. Another legacy system, a Track Management Service (TMS), manages the sharing track data amongst the legacy systems. In one example, the interfaces 404a-404d corresponds to the external communications component 312 and the external data source component 314 (FIG. 3).

The information manager 406 translates simple object actions into Structured Query Language (SQL), for example, that operates on storage tables stored in the data store 408. In one example, the data store 408 stores normalized targets.

The GUI 416 provides the user with a visual representation of the target data following, for example, a Model/View/Controller paradigm. In one example, the GUI 416 represents a combination of the situational awareness 310 and the workspace 304.

The NCT system 400 uses a different data model than legacy systems because the increase in number of joint operations (i.e., more than one uniformed service such as an Army and Air Force joint operation) dictates an increasing need for a common understanding of targets and the targeting process because terminology and data requirements vary not only by system within the kill chain, but also by (uniformed) service executing the kill chain. Thus, there are numerous other combinations of processes for targeting, but what they all have in common is that each step of the process is handled by a system and the transition between steps is handled by a human operator, even within a single service. There is no single targeting system that allows the operator to follow a target from cradle to grave. The problem becomes even more complex when the concept of joint targeting (i.e., more than one branch of the armed forces is used, e.g., Army and Air Force) is introduced. Systems within an armed forces service often have very specific data formats and interfaces that relate to the tasks needed to be performed in their particular segment of the targeting process. Much of the data and understanding is often lost in the translation between systems (when data is shared between systems) unless it is firmly lodged in the mind of the human operator. The burden is then placed on the shoulders of the targeting personnel (human beings), to maintain a coherent picture of the target's life-cycle across all the systems involved and even across the different services.

As an example, a spot report received by Army intelligence may be forwarded to the AFATDS from the All Source Analysis System (ASAS) as a Target. This target is converted from the ASAS representation to fit the variable message format (VMF) message set and stored in the AFATDS. Items like the target type may have a many-to-one relationship and the "SCUD-D" launcher may now be only known as "Missile, Unknown." The entity ID may also be different than the target number assigned by the AFATDS. The target may then be sent to the Air Force component to be engaged by air interdiction. During this whole process, the targeting personnel from both services are trying to maintain integrity of the target data and data sources. Thus, targeting personnel are forced to collaborate and share data not supported by the messaging interfaces via Chat Tools, Microsoft Office, e-mail and even voice telephone calls. Manual coordination and tracking matrices are used to track approvals and keep target IDs correlated.

To address these shortcomings, the NCT system 400 uses a data model for a target that can handle all variants of data for any system. Past attempts for a unified data model have so far failed because they tend to either closely model the structure of a particular system, or else they take the common components of all systems and ignore some relevant information for specific systems.

Thus, no single targeting repository exists to provide the commander with a complete battle-space-wide single application (SA) view of both strategic and tactical targets. However, the NCT system 400 generates unique target identifiers for all targets. Also, maintains system-specific target identifiers for each system (e.g., legacy system) so that the user can easily refer to a target with the operator of the other system. The use of the unique target identifiers and the system-specific target identifiers aids in target correlation. In one example, the unique target identifiers and the system-specific target identifiers stored in the data base 408.

In one example, targets are harvested from the legacy systems and the information is mapped to a JTM Normalized Target (JNT) data structure (e.g., stored in the data base 408). System-specific target information required for communications is kept along with the normalized target data structure so that the user can easily refer to a target with an operator of another system. Thus, the NCT system 400 allows for system of systems growth without replacing legacy applications.

In particular, NCT system 400 provides a target ID key that contains a JTM ID as well as target IDs for all other contributing systems. This allows for the enhanced sharing of targeting data with other systems. It also allows the operator to quickly share and understand when talking with other operators that may only know of targets by a certain type of ID.

The NCT system 400 expands on the targeting schema of a target service agent (TSA) to provide a more comprehensive common targeting schema. The NCT system 400 translates targeting data from multiple sources into a common "normalized" schema, and in turn translates "normalized" target data into the multiple other external system formats when required for prosecution and distribution to external systems. Any data that is not normalized because of its platform specificity is nevertheless translated and stored with the normalized target for viewing. Images, sound files and movie clips can be associated with a target in the collection process, just like in Joint Theater Logistics Management (JTLM), for example. These multimedia files can be viewed and/or listened to by any of the readily available commercial viewers or players using the GUI 416, for example.

Thus, the NCT system 400 automatically inputs targeting and enemy unit/track data from current force systems AFATDS and TBMCS. For example, interfaces of the JTM were expanded to also automatically input Global Command and Control System (GCCS) track data from the Command and Control Personal Computer (C2PC) Track Management System (TMS), and to input potential and actual target data from Cursor on Target (CoT)-capable systems. Like both TSA and JTLM, JTM provides a Web Services Description Language (WSDL) interface for network-based targeting interactions with user systems. The NCT system 400 also automatically collects/exchanges/distributes targeting information with other JTM instances across the battle-space via the gateway 418.

Higher echelon commanders typically see strategic and deep targets, but these typically do not include lower level tactical targets unless specifically pushed to them. The NCT system 400 allows the higher echelon commanders to see both tactical and strategic targets by sharing target data by allowing the use of push interfaces such as message formats (e.g., USMTF, JVMF), Cursor-on-Target and point-to point interfaces.

The NCT system 400 includes a subscription capability that enables users to receive in near real-time updates for specified targets without continually polling other systems and sensors for that information. Users subscribe to see updates for targets that they are interested in by specifying particular attributes for those targets. Examples include targets of a particular target type, appearance or presence or location in specific geographic areas, and change in status, among others. User systems can utilize target updates as triggers for further action, such as responding to time critical targets.

The NCT system 400 provides not only target duplication check capability, but also the capability to identify other potential instances of the same target, and to merge target data and folders if targets are found to be duplicates. This is a fundamental difference between the NCT system 400 and past approaches which have allowed for the posting of potentially duplicate target data. This leaves the operator with having to manage two targets that represent the same battlefield entity. In the NCT system 400, targets that are posted are automatically checked for duplication, normalized and then merged as appropriate; any data that is not normalized is retained in the target associated and stored with the normalized target. Subsequent updates are made to the normalized target.

Prior art orchestration of kill chain activities is ad-hoc, manual and requires methods outside of current applications to work around the communications barrier (chat, voice, email, etc.). These prior art targeting systems each use separate methodologies that are process-centric and service unique.

On the other hand, NCT system 400 provides orchestration of all targeting activities within single application framework. Due to the inherent connectivity of the system, the NCT system 400 allows the user to completely navigate the kill chain from target acquisition to effects delivery. By enabling the communications of information across all of the disparate systems within the battle-space, the operator can orchestrate a response following all doctrinal rules without having to resort to stop-gap communication paths. Furthermore, because the information flows in a net-centric environment, the operator is also not relegated to following a specific linear process; the user instead can manage multiple threads/events at the same time and not be held up by an unresponsive modules 12a-12g in the chain. This greatly reduces the timeline response in any given targeting event.

In other embodiments, each of the modules 12a-12g is embodied by a set of services and not a stand-alone system. The interaction of these services completely removes all barriers to information sharing and drastically increases the effectiveness of the target engagement process.

Elements of different embodiments described herein may be combined to form other embodiments not specifically set forth above.

What is claimed is:

1. A network-centric targeting system, comprising: modules comprising:
    a prepare module configured to plan for targeting engagements and to identify a target;
    a sense module configured to locate targets of opportunity and targets generated by the prepare module to form targeting information;
    a refine module configured to enhance the targeting information from the sense module;
    a track module configured to maintain a location of a target, a state of the target and target activity, the track module being directly coupled to the refine module by at least one of a wired or wireless connection;
    a target module configured to select effects and to coordinate delivery of selected effects to the target, the target module being directly coupled to each of the track module, the refine module and the sense module by at least one of a wired or wireless connection;
    a deliver module configured to deliver effects to the target, the deliver module being directly coupled to each of the track module, the refine module, the target module and the sense module by at least one of a wired or wireless connection; and
    an assess module configured to assess effectiveness of the delivered effects on the target, the assess module being directly coupled to each of the track module, the deliver module, the target module, the sense module and the prepare module by at least one of a wired or wireless connection,
    wherein one or more of the modules include a processor and a storage medium to store executable instructions performed by the processor;
    wherein the modules are configured to provide a user with a battle-space-wide single application (SA) view of both strategic and tactical targets.

2. The system of claim 1 wherein at least two of the modules are processing simultaneously.

3. The system of claim 1 wherein the modules are implemented using a schema comprising:
    an external communications interface connected to one or more external data sources; and a target server to receive target updates from the external communications interface and to provide normalized target data.

4. The system of claim 3 wherein the one or more external data sources comprises:
a Joint Target Manager (JTM) system;
an Advanced Field Artillery Tactical Data System (AFATDS); and
a Theater Battle Management Core Systems (TBMCS).

5. The system of claim 4 wherein the schema further comprises a database that stores, for a target, a JTM ID and target IDs for the AFATDS system and the TBMCS system.

6. The system of claim 3 wherein the schema further comprises a web service.

7. The system of claim 3 wherein the schema further comprises a gateway plug-in.

8. The system of claim 3 wherein the schema further comprises:
a situational awareness component to provide map displays; and
a workspace component to collect screens to render target data.

9. A method to provide a network-centric targeting system comprising:
planning for targeting engagements comprising identifying a target;
sensing a target comprising locating targets of opportunity and targets generated by the planning to form targeting information;
enhancing the targeting information;
tracking a location of a target, a state of the target and target activity using the enhanced targeting information;
targeting the target to select effects and to coordinate delivery of the selected effects to the target;
delivering the selected effects to the target;
receiving target data on the target from external systems;
providing a unique target identifier for the target;
providing system-specific target identifiers for the external systems; and
assessing an effectiveness of the delivered effects on the target, the assessing based on the tracking, the delivering, the sensing and the preparing.

10. The method of claim 9, further comprising providing a user with a battle-space-wide single application (SA) view of both strategic and tactical targets.

11. The method of claim 9 wherein receiving target data on the target from external systems comprises receiving target data on the target from a Joint Target Manager (JTM) system, an Advanced Field Artillery Tactical Data System (AFATDS) system and a Theater Battle Management Core Systems (TBMCS) system.

12. The method of claim 9, further comprising using the unique target identifiers and the system-specific identifiers in target correlation.

13. An article comprising:
a non-transitory machine-readable medium that stores executable instructions to provide a network-centric targeting system, the instructions causing a machine to:
plan for targeting engagements comprising identifying a target;
sense a target comprising locating targets of opportunity and targets generated by the planning to form targeting information;
enhance the targeting information;
track a location of a target, a state of the target and target activity using the enhanced targeting information;
target the target to select effects and to coordinate delivery of the selected effects to the target;
deliver the selected effects to the target;
receive target data on the target from external systems;
provide a unique target identifier for the target;
provide system-specific target identifiers for the external systems; and
assess an effectiveness of the delivered effects on the target, the assessing based on the tracking, the delivering, the sensing and the preparing.

14. The article of claim 13, further comprising instructions causing a machine to provide a user with a battle-space-wide single application (SA) view of both strategic and tactical targets.

15. The article of claim 13 wherein the instructions causing a machine to receive target data on the target from external systems comprises instructions causing a machine to receive target data on the target from a Joint Target Manager (JTM) system, an Advanced Field Artillery Tactical Data System (AFATDS) system and a Theater Battle Management Core Systems (TBMCS) system.

16. The article of claim 13, further comprising instructions causing a machine to use the unique target identifiers and the system-specific identifiers in target correlation.

* * * * *